United States Patent
Hamilton, II et al.

(10) Patent No.: US 9,665,549 B2
(45) Date of Patent: *May 30, 2017

(54) SYSTEMS AND METHODS FOR CUSTOMIZING APPEARANCE AND BEHAVIOR OF ELECTRONIC DOCUMENTS BASED ON A MULTIDIMENSIONAL VECTOR OF USE PATTERNS

(71) Applicant: International Business Machines Corporation, Armonk, NY (US)

(72) Inventors: Rick A. Hamilton, II, Charlottesville, VA (US); James R. Kozloski, New Fairfield, CT (US); Brian M. O'Connell, Cary, NC (US); Clifford A. Pickover, Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 317 days.

This patent is subject to a terminal disclaimer.

(21) Appl. No.: 14/017,376

(22) Filed: Sep. 4, 2013

(65) Prior Publication Data

US 2014/0258839 A1    Sep. 11, 2014

Related U.S. Application Data

(63) Continuation of application No. 13/793,588, filed on Mar. 11, 2013, now Pat. No. 9,563,609.

(51) Int. Cl.
*G06F 17/22* (2006.01)
*G06F 7/00* (2006.01)
*G06F 3/048* (2013.01)
*G06F 3/02* (2006.01)

(52) U.S. Cl.
CPC .......... *G06F 17/2247* (2013.01); *G06F 17/22* (2013.01)

(58) Field of Classification Search
CPC ............................. G06F 17/22; G06F 17/2247
See application file for complete search history.

(56) References Cited

U.S. PATENT DOCUMENTS

| 5,870,092 A | 2/1999 | Bedford-Roberts |
| 6,597,314 B1 | 7/2003 | Beezer et al. |
| 7,342,569 B2 | 3/2008 | Liang et al. |

(Continued)

OTHER PUBLICATIONS

W.C. Hill et al., "Edit Wear and Read Wear," SIGCHI Conference on Human Factors in Computing Systems (CHI), May 1992, pp. 3-9.

(Continued)

*Primary Examiner* — Cesar Paula
*Assistant Examiner* — Konrad Kulikowski
(74) *Attorney, Agent, or Firm* — Vazken Alexanian; Ryan, Mason & Lewis, LLP

(57) ABSTRACT

Systems and methods for customizing electronic documents based on use patterns are provided. A computer implemented method for customizing an electronic document, comprises automatically monitoring an interaction of a user with the document on an electronic device for reading the document to determine an area of interest of the document, determining the area of interest based on the user interaction, and altering cumulatively at least one of the appearance or behavior of the document on the electronic device at the area of interest, wherein the cumulative alteration is a function of a variable measure of the user interaction over a range.

20 Claims, 5 Drawing Sheets

(56) References Cited

U.S. PATENT DOCUMENTS

| | | | |
|---|---|---|---|
| 7,350,704 | B2 | 4/2008 | Barsness et al. |
| 2003/0210226 | A1 | 11/2003 | Ho et al. |
| 2004/0080541 | A1 | 4/2004 | Saiga et al. |
| 2006/0155782 | A1 | 7/2006 | Berstis et al. |
| 2009/0293009 | A1* | 11/2009 | Meserth .............. G06F 3/0362 715/771 |
| 2011/0010611 | A1 | 1/2011 | Ross |
| 2011/0050594 | A1 | 3/2011 | Kim et al. |
| 2013/0232439 | A1* | 9/2013 | Lee .................... G06F 3/0488 715/776 |
| 2014/0143705 | A1 | 5/2014 | Boulanger et al. |

OTHER PUBLICATIONS

Y.-C. Chu et al., "Realistic Books: A Bizarre Homage to an Obsolete Medium?" 4th ACM/IEEE-CS Joint Conference on Digital Libraries (JCDL), Jun. 2004, pp. 78-86.

C.C. Marshall et al., "Designing e-Books for Legal Research," 1st ACM/IEEE-CS Joint Conference on Digital Libraries (JCDL), Jun. 2001, pp. 41-48.

Bakari Chavanu, "Why Apple's iBooks is the Best E-Reader for making Annotations," http://www.makeuseof.com/tag/apples-ibooks-ereader-making-annotations/, Oct. 27, 2010, 8 pages.

Mobipocket, "Mobipocket Reader Desktop 6.2," http://www.mobipocket.com/en/downloadsoft/productdetailsreader.asp, Mar. 5, 2013, 3 pages.

AVEC Mobile, "Samsung eReader Lets You Annotate Ebooks With Stylus," http://www.avecmobile.com/index.php?id=1566, Apr. 1, 2010, 8 pages.

"Books and Ebooks," http://computerhelpers.wordpress.com/home/books-and-ebooks/#bookmarks, Mar. 5, 2013, 6 pages.

Flippingbook, "Engage and Expand Your Audience," http://page-flip.com/, Mar. 5, 2013, 2 pages.

\* cited by examiner

SYSTEMS AND METHODS FOR CUSTOMIZING APPEARANCE AND BEHAVIOR OF ELECTRONIC DOCUMENTS BASED ON A MULTIDIMENSIONAL VECTOR OF USE PATTERNS

CROSS-REFERENCE TO RELATED APPLICATION

This application is a Continuation of U.S. application Ser. No. 13/793,588, filed on Mar. 11, 2013, the disclosure of which is incorporated herein in its entirety by reference.

TECHNICAL FIELD

The field generally relates to systems and methods for customizing an electronic document, and in particular, to systems and methods for enhancing electronic book (e-book) and smart phone readers by the automatic creation of visual use marks and simulated page-flip delays and detents, which enable users to find and remember content in documents such as e-books.

BACKGROUND

An electronic book (e-book) is a book-length publication in digital form, comprising text, images, or both. An e-book may be produced on, published through, and readable on computers and other electronic devices. For example, e-books may be read on dedicated hardware devices known as e-readers or e-book devices, on personal computers, tablet computers and mobile phones. E-books can originate in digital form, i.e., have their initial incarnations in electronic form. In such cases, e-books may exist without any printed equivalent.

People who are accustomed to using traditional books often find and remember content in documents in an intuitive manner, for example, by recalling various visual aspects of a page, even including the degree of page use by dirt on a page, or by flipping through books and finding content. The speed of manual flipping of pages in an actual book can depend on certain factors, for example, use of the book, and the condition of pages and book spines. Delays in page flipping caused by one or more of these factors can help a user find content. Presently, no known methods exist to help individuals perform equivalent actions in e-books, whether the content resides on dedicated readers, smart phones, tablets, or other such devices.

Current technology allows users of e-book readers or other devices on which e-books can be read, to manually create simple bookmarks, which allow users to "jump" to sections of e-books. Additional known methods permit manually highlighting lines of text and annotating e-books, for example, by using a stylus.

SUMMARY

In general, exemplary embodiments of the invention include systems and methods for customizing an electronic document, and in particular, to systems and methods for enhancing electronic book (e-book) and smart phone readers by the automatic creation of visual use marks and simulated page-flip delays and detents, which enable users to find and remember content in documents such as e-books.

According to an exemplary embodiment of the present invention, a system for customizing an electronic document including a memory and a processor communicatively coupled to the processor, comprises a tracking module capable of automatically monitoring an interaction of a user with the document on an electronic device for reading the document, wherein the tracking module determines an area of interest of the document based on the user interaction, and a display module capable of altering cumulatively at least one of the appearance or behavior of the document on the electronic device at the area of interest, wherein the cumulative alteration is a function of a variable measure of the user interaction over a range.

According to an exemplary embodiment of the present invention, a computer implemented method for customizing an electronic document, comprises automatically monitoring an interaction of a user with the document on an electronic device for reading the document to determine an area of interest of the document, determining the area of interest based on the user interaction, and altering cumulatively at least one of the appearance or behavior of the document on the electronic device at the area of interest, wherein the cumulative alteration is a function of a variable measure of the user interaction over a range.

According to an exemplary embodiment of the present invention, an article of manufacture comprises a non-transitory computer readable storage medium comprising program code tangibly embodied thereon, which when executed by a computer, performs method steps for customizing an electronic document, the method steps comprising automatically monitoring an interaction of a user with the document on an electronic device for reading the document to determine an area of interest of the document, determining the area of interest based on the user interaction, and altering cumulatively at least one of the appearance or behavior of the document on the electronic device at the area of interest, wherein the cumulative alteration is a function of a variable measure of the user interaction over a range.

According to an exemplary embodiment of the present invention, an apparatus for customizing an electronic document, comprises a memory, and a processor coupled to the memory and configured to execute code stored in the memory for automatically monitoring an interaction of a user with the document on an electronic device for reading the document to determine an area of interest of the document, determining the area of interest based on the user interaction, and altering cumulatively at least one of the appearance or behavior of the document on the electronic device at the area of interest, wherein the cumulative alteration is a function of a variable measure of the user interaction over a range.

These and other exemplary embodiments of the invention will be described or become apparent from the following detailed description of exemplary embodiments, which is to be read in connection with the accompanying drawings.

BRIEF DESCRIPTION OF THE DRAWINGS

Exemplary embodiments of the present invention will be described below in more detail, with reference to the accompanying drawings, of which.

DETAILED DESCRIPTION OF EXEMPLARY EMBODIMENTS

Figure 1:
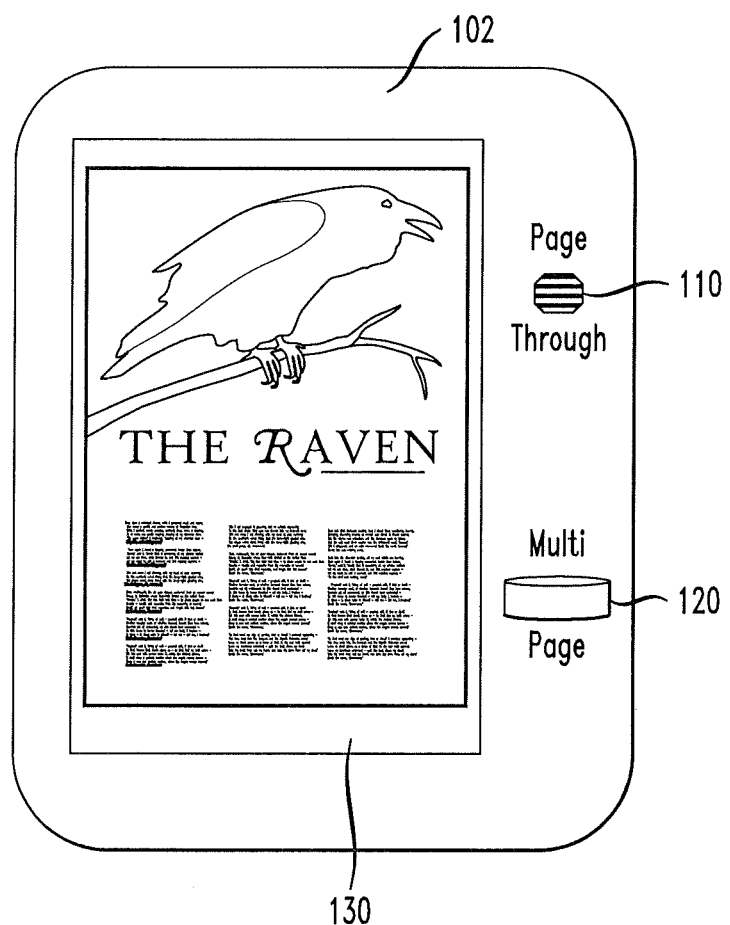
FIG. 1 illustrates an e-book reader used for viewing electronic documents, such as e-books, according to an embodiment of the present invention.

Exemplary embodiments of the invention will now be discussed in further detail with regard to systems and methods for customizing an electronic document, and in particular, to systems and methods for enhancing electronic book (e-book) and smart phone readers by the automatic creation of visual use marks and simulated page-flip delays and detents, which enable users to find and remember content in documents such as e-books. This invention may, however, be embodied in many different forms and should not be construed as limited to the embodiments set forth herein.

According to embodiments of the present invention, the following definitions may apply to the following terms used in this disclosure:

"Pages": partitioned segments of a multimedia document, displayed sequentially within a frame, such as pages of an electronic book.

"e-book", "digital book", "electronic book": a multimedia document comprising pages displayed electronically, often simulating some aspects of the experience of reading a physical book, magazine or some other bound volume.

"e-book reader", "e-reader": a device used to display and navigate an e-book, digital book, or electronic book.

"turn" or "flip": traverse pages of an e-book, digital book, or electronic book

"rapid page turn", "rapid page flip": to traverse pages of an e-book, digital book, or electronic book at a rate faster than a reader typically reads pages. This mode of turning pages can still allow some information to be gathered by the reader.

"timing of page turn", "timing of page flip": the time a page is presented to a user during rapid page turn, page flip.

"automatic page turn", "automatic page flip", "multiple page turn", "multiple page flip": traverse pages in groups such that uncertainty exists about which page will be displayed when traversal is complete.

"reading an e-book": the traversal and consumption of media from the pages of an e-book, digital book, or electronic book.

Embodiments of the present invention provide a system and method to enable individuals to find and/or cognitively recall favorite, important, and/or often-used sections and pages within an e-book, or other electronic document, such as, for example, an electronic magazine (e-zine), catalog (e-catalog), etc., that can be read on an electronic device. The electronic device, can include, but is not limited to, a dedicated hardware device known as an e-reader, or e-book device, or personal computers, tablet computers and mobile phones, such as smart phones.

Embodiments of the present invention automatically visually augment certain pages and cognitively assist in page location and recall through the insertion of delays (e.g., millisecond delays) and visual markers that can be sensed by a user when moving through an electronic document, such as an e-book. The visual markers can provide enhanced cognitive recognition, and in accordance with an embodiment of the present invention, may be automatically computed and inserted. Delays, for example, millisecond delays, in the flipping of pages while rapidly moving through an e-book can enable the user to locate favorite pages and sections. In accordance with an embodiment of the present invention, such delays and detents may be automatically computed and inserted.

Referring to FIG. 1, an e-book reader 102 or other electronic device used for viewing electronic documents, such as e-books, is shown. According to an embodiment, the e-book reader 102 includes a button 110 that the user may depress and hold to initiate sequential page flipping. Alternatively, a user may turn a dial or rocker 120 embedded in the device to flip pages. The rocker 120 can include a restorative spring mechanism, such that an angle of deflection of the dial or rocker and the rapidity and force of deflection are provided as inputs to the device to indicate speed of page flipping. For example, the dial or rocker 120 can be used to simulate a forceful turning of pages so that multiple pages can be turned at once. The dial or rocker can be used to initiate other behaviors, such as, for example, zooming and/or highlighting/annotating of text. In another alternative, the e-book reader 102 includes a screen 130 that is a touchscreen responsive to pressure and movement from the fingers of a user to flip pages, wherein a faster rate of hand or finger movement by the user results in faster or multiple page flipping, and wherein certain movements or pressures of fingers on the screen can result in zooming or highlighting/annotating of text.

Figure 2:
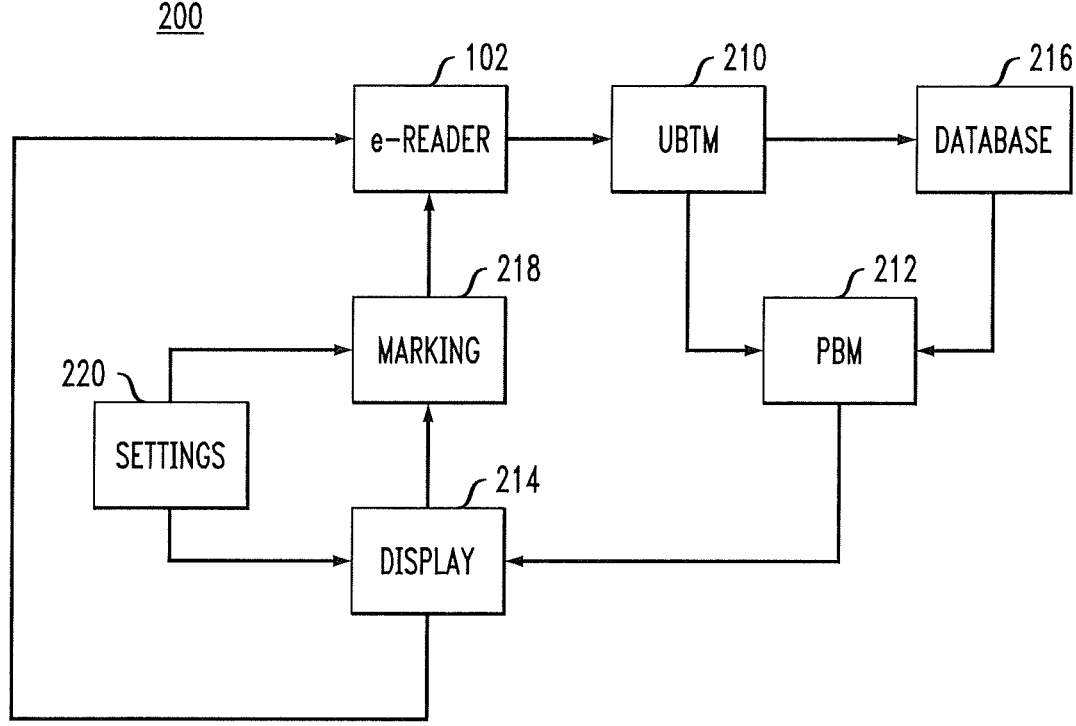
FIG. 2 illustrates a system for customizing an electronic document, according to an embodiment of the present invention.

Referring to FIG. 2, a system 200 for customizing an electronic document, according to an embodiment of the present invention, includes an e-book reader 102 or other electronic device that can be used for viewing the electronic documents. The system further includes a user-behavior tracking module (UBTM) 210, which records and monitors user interactions with the e-book to determine areas of interest in the e-book, and a page-behavior module (PBM) 212, which determines appropriate page behavior parameters for each page (e.g., delays or probabilities of appearance after multiple page turns) based on information recorded by the UBTM 210. A display module 214 implements the calculated behaviors determined by the PBM 212, to present pages based on calculated timing of page turns, and on probabilities of pages appearing after automatic multiple page turns. The display module 214 includes a marking engine 218 electronically coupled thereto, which graphically marks certain pages of the electronic document based on use information recorded by the UBTM 210, so that the pages deemed to be of interest contain elements of differentiation. The information recorded by the UBTM 210 can be stored in a database 216. The system may further include a settings module 220, which inputs settings, such as pre-defined user settings, to the display module, including the marking engine, regarding settings for delays, detents and/or graphical markings that have been pre-defined by a user, author, manufacturer, etc.

According to an embodiment, the components 210, 212, 214, 216, 218 and 220 of the system can be included in an e-reader 102 or other device for reading the electronic documents. Alternatively, the components 210, 212, 214, 216, 218 and 220 can be located in some remote facility, for example, a cloud computing facility or service facility communicatively coupled to the e-book reader 102.

According to an embodiment of the present invention, the marking engine 218 or other module graphically marks certain pages of the electronic document so that they contain elements of differentiation. These elements may include, but are not limited to, electronic representations of dirt, smudges, stains, hairs, rips, folds, coffee spills, cup rings, dust, browning on edges, and/or other such use indicators. Such marking can make an electronic document, such as an e-book, customized and appear more like a physical book or publication. The markings can also serve as a cognitive enhancement, enabling users to more easily remember where information may lie in the document.

In accordance with an embodiment of the present invention, the graphical marking is performed automatically by a module, such as marking engine 218 based on, for example, randomness, algorithms, user preferences, author preferences, publisher preferences, controlled elements, thresholds, and/or tracking or monitoring of use by a primary reader or many readers recorded by the UBTM 210. Algorithms, user preferences, author preferences, publisher preferences, controlled elements, and/or thresholds can be programmed via and stored in the settings module 220, which is electronically coupled to the marking engine 218. According to embodiments of the present invention, the marking or simulated visual degradation can evolve with, for example, how many times a user turns a page, eye tracking to determine what or where a user is reading, using, for example, biometric sensors, mouse tracking, and/or other such environmental factors which can be tracked by the UBTM 210. According to an embodiment, in the area of education, the marking or simulated visual degradation may serve as a cognitive aid in an electronic learning (e-learning), online education, and/or electronic textbook (e-textbook) domain, allowing learners (e.g., students) to more intuitively recognize material they have studied. In addition, implementation of the embodiments of the present invention can lead to people purchasing or using e-books who do not ordinarily like the non-physical features of e-books.

According to embodiments of the present invention, usage marks, such as, for example, smudges, which can be in the spirit of PHOTOSHOP filters, can be pre-programmed to accumulate based on use, and/or can be user-defined via the settings module 220. As an electronic document or e-book is used, and such use is recorded by the UBTM 210, a build-up of use print can be simulated via display module 214 and marking engine 218. As a result, a user can remember what is most read by such interactive traces. For example, the display module 214, including the marking engine 218 can alter cumulatively the appearance of the document by adding the usage indicators, which accumulate based on use. According to an embodiment, the cumulative alteration is a function of a variable measure of a user's interaction with the document over a range, the range being, for example, a number of times a user turns and/or turns to a page, a time period that a user spends at a page, a number of times a page was viewed by the particular reader or other readers, a number of annotations a particular reader or others have placed on the page and/or an amount of zooming and/or re-reading that has been performed on a page. According to an embodiment, cumulative changes in appearance can be weighted by a variable x: $0.0 > x > 1.0$ and accumulate based on this variable measure of usage and interest. In the case of appearance, dirt, smudges, browning and/or stains, for example, accumulate stepwise as x grows from 0 to 1.

In accordance with an embodiment, the markings and/or delays can be tailored to multiple people reading the same book. For example, a system can learn via recording by the UBTM 210 and/or be programmed to add markings or delays via the settings module 220 according to each user's cognitive style and/or use history. The document or e-book, when opened for a particular user or group of users, can have different markings and/or delays than when opened for another user or group of users. Also, in accordance with an embodiment of the present invention, the PBM 212 can map aggregate behavior for more than one individual to a single book. Other readers may, for example, be in a user's social network, or other users who have bought and read the book. The nature of the differentiation elements can be persistent across the different electronic devices used for viewing the electronic documents or left on a primary device, and not conveyed when moving the digital representation to new devices.

In accordance with embodiments of the present invention, delays associated with simulated book page flipping on an e-book reader or other electronic devices that can be used for viewing the electronic documents can be automatically introduced by computing a page delay time based on one or more of: (1) the amount of time a reader and/or other readers have spent on the page; (2) the number of times a page was viewed by the particular reader or other readers; (3) the number of annotations the particular reader or others have placed on the page; and/or (4) the amount of zooming and/or re-reading that has been performed on a page. It is to be understood that this is not an exhaustive list, and other factors may be used to compute delay factors. In accordance with embodiments of the present invention, the features for computing delay factors can be recorded by the UBTM 210, computation can be performed by the PBM 212, and implementation of delay factors can be performed by the display module 214.

According to embodiments of the present invention, a delay factor can include one or more of: (1) a time delay (e.g., quarter-second); (2) detent; and (3) a sound to accompany the page delay. In physical terms, a "detent" can refer to a method or device used to mechanically resist or stop rotation of a component, such as a wheel, axle or spindle or other related moving element, and has been used to divide a rotation or movement into discrete increments. For example, detents can be responsible for the "clicking" and tactile feel when rotating certain dials. In the case of embodiments of the present invention, a detent relates to a vibrational component corresponding to certain locations in an e-book or other electronic document in order to give a user tactile feedback while "flipping" through pages via, for example, a finger or hand motion on a touchscreen of the device on which the electronic document is presented.

According to embodiments of the present invention, the detents (e.g., detent intensity) can vary as a function of the various conditions described herein such as, for example, the amount of time a reader and/or other readers have spent on the page, the number of times a page was viewed by the particular reader or other readers, the number of annotations the particular reader or others have placed on the page, and/or the amount of zooming and/or re-reading that has been performed on a page.

Additionally, like the delays, graphical indicators of use applied across a page can automatically be added to pages of an electronic document, by computing a page usage factor based on one or more of: (1) the amount of time a reader and/or other readers have spent on the page; (2) the number of times a page was viewed by the particular reader or other readers; (3) the number of annotations the particular reader or others have placed on the page; (4) the amount of zooming and/or re-reading that has been performed on a page. It is to be understood that this is not an exhaustive list, and other factors may be used to compute usage. In accordance with embodiments of the present invention, the features for computing usage can be recorded by the UBTM 210, computation can be performed by the PBM 212, and implementation into graphical indicators can be performed by the display module 214 and marking engine 218.

In accordance with an embodiment of the present invention, a page or pages of an electronic document can be designated as areas of interest if a user, for example: spends more time on a page(s) or visits a page(s) more often than others, has electronically annotated the page(s), and/or implemented a zoom gesture on the page(s). It is to be understood that the preceding are exemplary in nature and are not intended to limit the types of activity that may indicate interest in an area of the document.

According to an embodiment, a drawn spine of a book is visually augmented to indicate more use than other pages, imitating a book that is laid open for a long period of time on a particular page. The image of the book at the particular page shows the text as shifted farther away from the spine than on other pages that have been used less than the particular page to indicate the tendency of the book to stay open at the particular page. The appearance of the shifted text can enhance cognitive recognition by the user. According to an embodiment, the visual marking may be extended to an image of the outside spine of the book to show creases at or near areas of interest. For example, the outside of books can be rendered on a reader in three dimensions during selection, showing a bookshelf on which the books are placed. In this rendering, the outside of the spine(s) can be marked with creases to indicate the areas of the most interest. As a result, a user can select a book off a virtual shelf, have an indication of what general location in which the areas of interest reside, and fine tune the page movement to sections that contain the areas of interest. Any combination of the PBM 212, display module 214 and/or marking engine 218, based on input from the UBTM 210 and/or settings module 220, can be used to implement the referenced features in connection with the spine.

According to an embodiment, pauses, for example, measured in some number of milliseconds, are inserted between pages to appear during page turning in an e-book to assist users in locating sections of interest. For example, during rapid page turning, when the system updates a page display, the system will insert a small pause at a previously marked or noted area of interest before moving on to the next page. This momentary pause will be long enough such that the user can recognize the page at the area of interest and stop the page movement, or revert to the last rendered area of interest. In another embodiment, when flipping stops, the e-book or other type of electronic document may open to the next available page that has the most use to simulate a situation where a physical book may be prone to open to a highly read or often used page. Any combination of the PBM 212 and/or display module 214, based on input from the UBTM 210 and/or settings module 220, can be used to implement the referenced features in connection with pauses.

Like with the appearance of the document, the display module 214 can alter cumulatively the behavior of the document by adding elements which accumulate based on use, for example, pauses, detents, and/or an increase in the probability of landing on a page after multiple page flips. According to an embodiment, the cumulative alteration is a function of a variable measure of a user's interaction with the document over a range, the range being, for example, a number of times a user turns and/or turns to a page, a time period that a user spends at a page, a number of times a page was viewed by the particular reader or other readers, a number of annotations a particular reader or others have placed on the page and/or an amount of zooming and/or re-reading that has been performed on a page. According to an embodiment, cumulative changes in behavior can be weighted by a variable x: $0.0 > x > 1.0$ and accumulate based on this variable measure of usage and interest. In the case of behavior, pauses, detents, and/or an increase in the probability of landing on a page after multiple page flips, for example, accumulate stepwise as x grows from 0 to 1.

Figure 3:
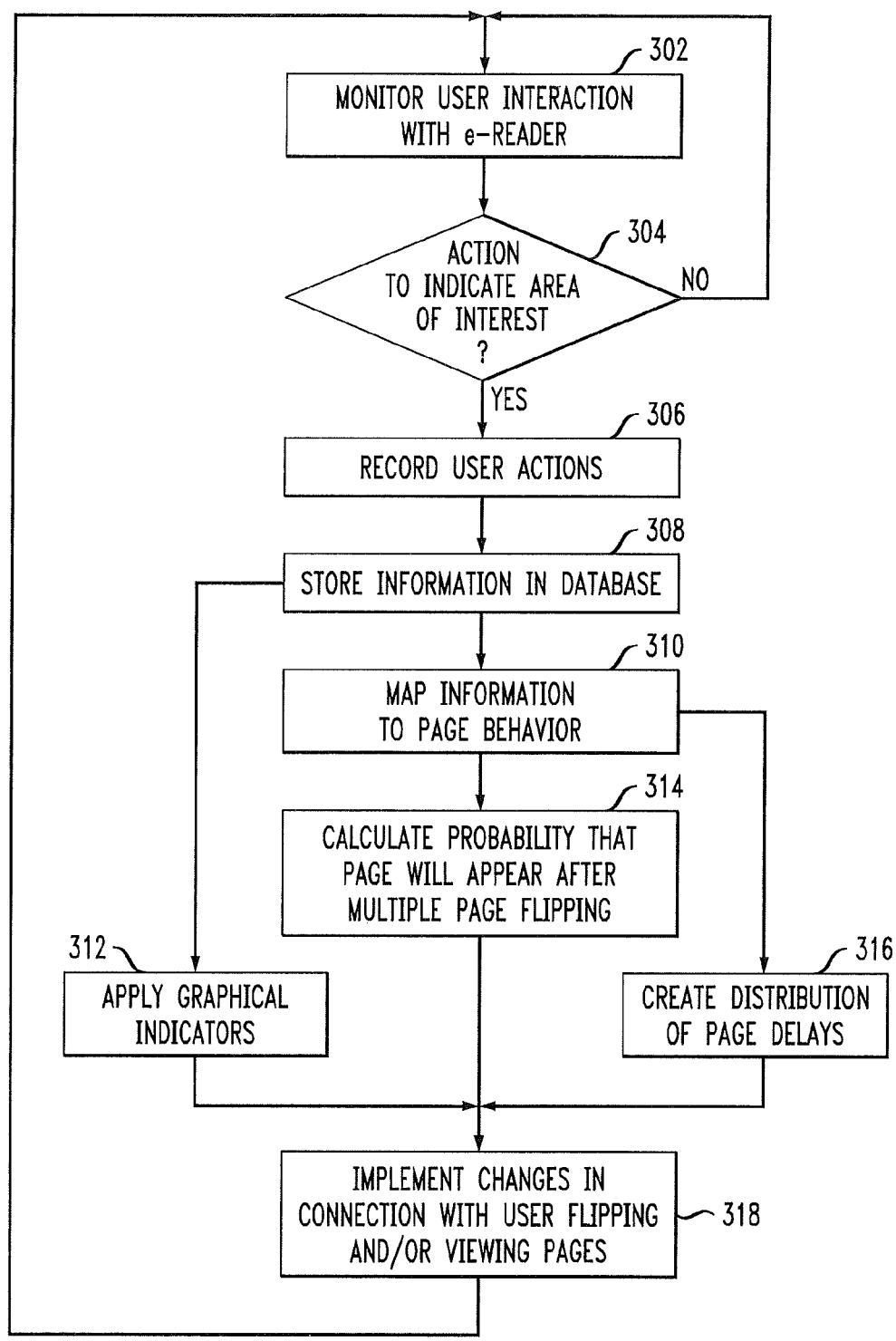
FIG. 3 illustrates a method for customizing an electronic document, according to an embodiment of the present invention.

Referring to FIG. 3, in a method for customizing an electronic document, according to an embodiment of the present invention, a user interacts with an e-book reader 102 (or related document viewer) by performing one or more actions to indicate an area(s) of interest. For example, over a predetermined time interval, or over a predetermined number of uses, demarcated by the user closing the e-book and/or turning off the e-book reader, a user may, for example, leave an e-book open on a first page for 30 seconds, on a second page for 100 seconds, and not spend any time on a third page. The user may also magnify a portion of and highlight several sentences on the second page.

At block 302, the system monitors user interaction with the e-reader 102 or other device used for reading electronic documents. If the user does not perform any actions to indicate areas of interest at block 304, the system, for example, the UBTM 210, continues to monitor and the method returns to block 302. If the user performs actions to indicate areas of interest at block 304, the UBTM 210 records the user actions (block 306) and stores the information in the database 216 (block 308). A record of the information stored in the database 216 may include information such as $D(p,d,m,h)=(20, 100, 3, 30)$, where D represents a multidimensional vector, p is the page number, d is the amount of time that the page was displayed, m is the number of times the page was magnified, and h is the number of words that were highlighted on the page. Accordingly, for example, (20, 100, 3, 30) indicates that page 20 was displayed for a period of 100 seconds, magnified three times, and had 30 words highlighted. According to an embodiment, the 100 seconds refers to 100 seconds while the user was actually touching the device, for example, holding the device, so as to avoid accumulating durations in which the device is left unattended and open to a page, and the user is not interacting with the material. The fact that a user is interacting with a device can be determined by various means, including pressure sensors, or other biometric sensors coupled to the device. A measure of user interaction with a device may be a moving average over a set time interval or number of uses. Measures of interaction may be recorded and calculated by components of a system, for example system 200, on the e-book reader itself, or in some remote facility, for example, a cloud computing facility or service communicatively coupled to the e-book reader.

In a further step at block 310, the PBM 212 mathematically maps the information contained in multidimensional vector D to actual behavior of the pages to be displayed on screen 130. The mapping may be calculated by components of a system, such as system 200, on the e-book reader itself, or in some remote facility, for example, a cloud computing facility or service communicatively coupled to the e-book reader.

At block 312, based on settings and the user interaction with particular regions, pages or groups of pages, graphical indicators are applied to page(s) of interest. In addition, based on settings and the user interaction with particular regions, pages or groups of pages, the mapping can lead to the calculation of probabilities that pages will appear after multiple page flipping (block 314) and/or creation of a distribution of page delays to be implemented when flipping through e-book (block 316). The changes to the page(s) are implemented in connection with a user flipping through and/or viewing the page(s) (block 318), and the system can continue to monitor further user interaction with the e-reader.

In accordance with an embodiment, in connection with block 316, $B(p)=|D(p,d,m,h)|*N$ provides a mapping, where $B(p)$ is a sub-second delay for page p (e.g., 30 milliseconds (but not limited thereto)), and N is an adjustable scale factor. The behavior may be altered such that the larger the deflection of the dial or rocker 120, or a functionally equivalent action on another mechanism for increasing the rate of flipping pages, the more rapid the rate of page flipping, while the time spent on any page during page flipping is an inverse proportion of the rate of flipping.

If a flipping rate is 50 pages per second, the average time per page is 20 milliseconds, and the PBM 212 can create a distribution of actual page delays with a standard deviation of ±5 milliseconds. The PBM 212 may also directly map information from D to the probability that a particular page will appear after automatic multiple page flipping (block 314). Fast, forceful deflections of the dial or rocker, or a functionally equivalent action on another mechanism for increasing the rate of flipping pages, may provide the input to the device resulting in multiple page turns. For example, such a forceful gesture by a user on a dial, rocker or touchscreen can result in simultaneously turning several pages, like grabbing multiple pages in a physical book, to advance to subsequent pages. Based on the use data gathered by the UBTM 210 from monitoring users to determine areas of interest, a next page displayed or landed on after multiple page turns can be a highly used/visited page that has been deemed an area of interest. Depending on settings, the force of the gesture and/or level of use of a page, the reader or device on which the document is read can stop or slow down at the page designated as an area of interest after multiple page turns are made. Pages are rendered in a distorted form as they are flipped, for example, by shearing, pinching, blurring, or otherwise altering the text.

Parameterized physical models may be used to mathematically map the information contained in multidimensional vector D to actual behavior of the pages to be displayed on screen 130, such as the model discussed in connection with FIG. 4 herein, in which the delays and probabilities for each page are a function of neighboring pages, as in a system of coupled springs.

A method for customizing an electronic document, according to an embodiment of the present invention makes use of a physical analogy of a system of virtual elastic springs modeled as a set of couplings between virtual components of an electronic document (such as, for example, pages, regions of pages, and words of an e-book). According to the model, pages, regions and/or words are coupled to each other via virtual springs between the components and to a rigid framework via virtual springs between predetermined components (e.g., end pages) and the rigid framework. The elastic coefficients of the couplings of this system are adjusted based on user interaction with the e-book, which are referenced by the model when a user flips pages or examines a page, to determine probabilities of a page or region appearing, and a time interval over which a device used for e-reading displays the page or region.

Figure 4:
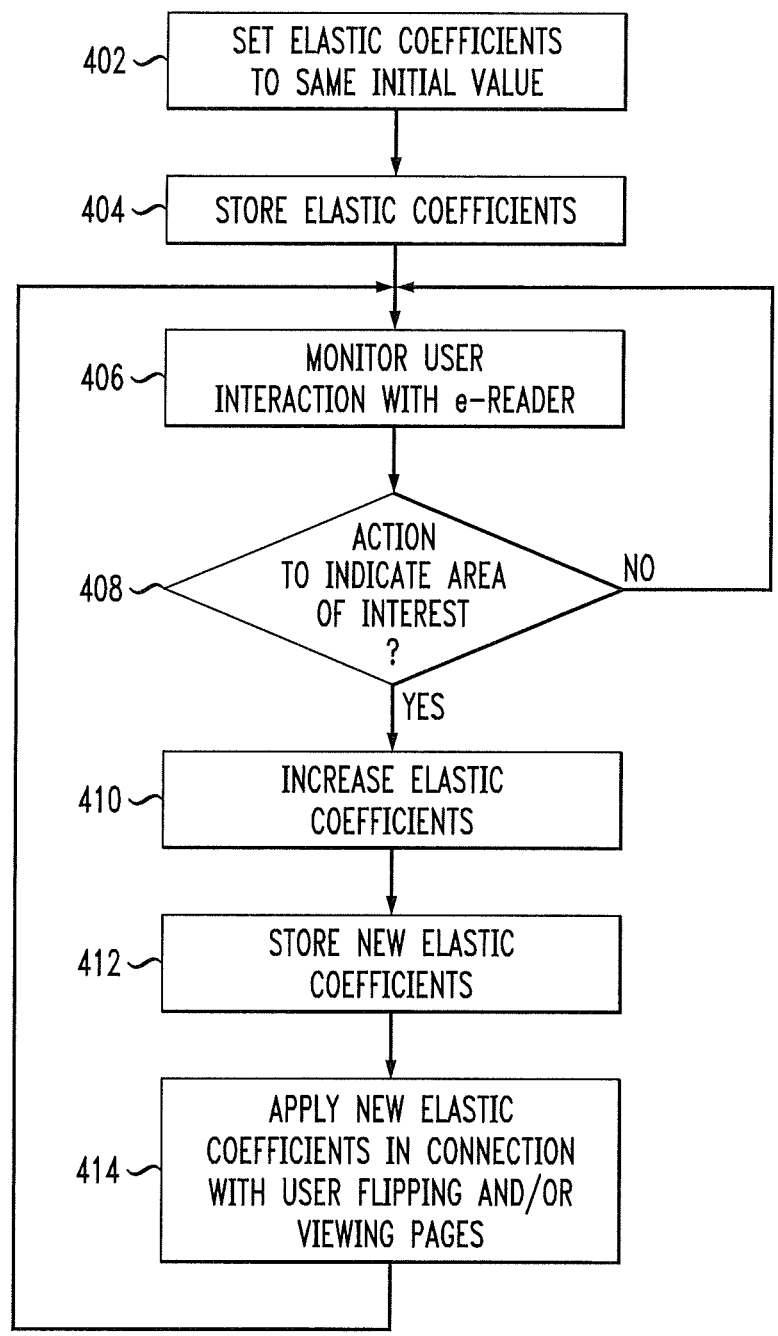
FIG. 4 illustrates a method for customizing an electronic document, according to an embodiment of the present invention.

Referring to FIG. 4, the method for customizing an electronic document, according to an embodiment of the present invention, includes storing elastic coefficients for linkages between every page to a level of granularity determined by an amount of memory available to model the e-book as a system of springs (block 404). According to an embodiment, elastic coefficients between parts of a page can also be stored. All coefficients are set to the same initial value (block 402) so that when a user first flips through the e-book, all pages and page regions pause with equal probability and identical time intervals, as determined by the physical model of the traversal of spring-coupled masses.

Like the method described in connection with FIG. 3, the system monitors user interaction with the e-reader 102 or other device used for reading electronic documents (block 406). If the user does not perform any actions to indicate areas of interest at block 408, the system, for example, the UBTM 210, continues to monitor and returns to block 406. If the user performs actions to indicate areas of interest at block 408, the UBTM 210 records the user actions. For example, when a user pauses on a page, zooms to a particular region for reading, or performs any other action through which the page or particular region will be deemed an area of interest, the spring coefficients coupling the page or region which is the area of interest to other pages, and the page to the rigid framework upon which the system rests, are increased (block 410) and stored (block 412). The increases are proportional to, for example, the amount of time the user spends reading the page or region, the number of times the page or region was viewed by the user, the number of annotations placed on the page or region, and/or the amount of zooming and/or re-reading that has been performed on the page or region. When a user flips through the e-book a second or subsequent times, pages and regions that have been perused recently pause with greater probability and longer time intervals, as determined by a model of the traversal of spring-coupled masses using the newly modified elastic coefficients (block 414), and the system can continue to monitor further user interaction with the e-reader.

According to an embodiment, elastic coefficients can decay back to their initial values over a predetermined time period chosen by, for example, the user, the manufacturer of the e-book reading device, or the publisher of the e-book. According to an embodiment, the spring system can be modeled using Hooke's Law:

$$F=kx \qquad (1),$$

where F is the force determining how likely a page or region appears, k is the elastic coefficient, and x is the current "displacement" of the page or region from a rest point of the page or region, due to a user flipping pages and/or examining regions and due to interaction from other pages or regions.

Embodiments of the present invention can also be applied to situations where advertisers in an electronic publication, such as, for example, an e-zine, wish to pay publishers to introduce delays in pages so that when a user is leafing through the e-zine, the pages with advertisements have delays (e.g., sub-second delays) so as to catch a user's attention. In addition, according to embodiments of the present invention, use patterns of certain users may be packaged or otherwise distributed to other e-book readers or devices to allow users to learn how others have read the same book, and utilize the use patterns of others. According to embodiments, the use patterns may come from individuals in similar fields or members of the same social network as the recipient. The use patterns of others can be stored in predetermined profiles, and can be applied to the e-books of recipients at their option. Further, use patterns derived from a user's interaction with an e-book can be translated into other media, such as, for example, study guides, tests, or other educational material. The use patterns may also be mapped onto a different book containing similar content.

As will be appreciated by one skilled in the art, aspects of the present invention may be embodied as a system, apparatus, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIGS. 1-4 illustrate the architecture, functionality, and operation of possible implementations of systems, methods, and computer program products according to various embodiments of the present invention. In this regard, each block in a flowchart or a block diagram may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagram and/or flowchart illustration, and combinations of blocks in the block diagram and/or flowchart illustration, can be implemented by special purpose hardware-based systems that perform the specified functions or acts, or combinations of special purpose hardware and computer instructions.

Figure 5:
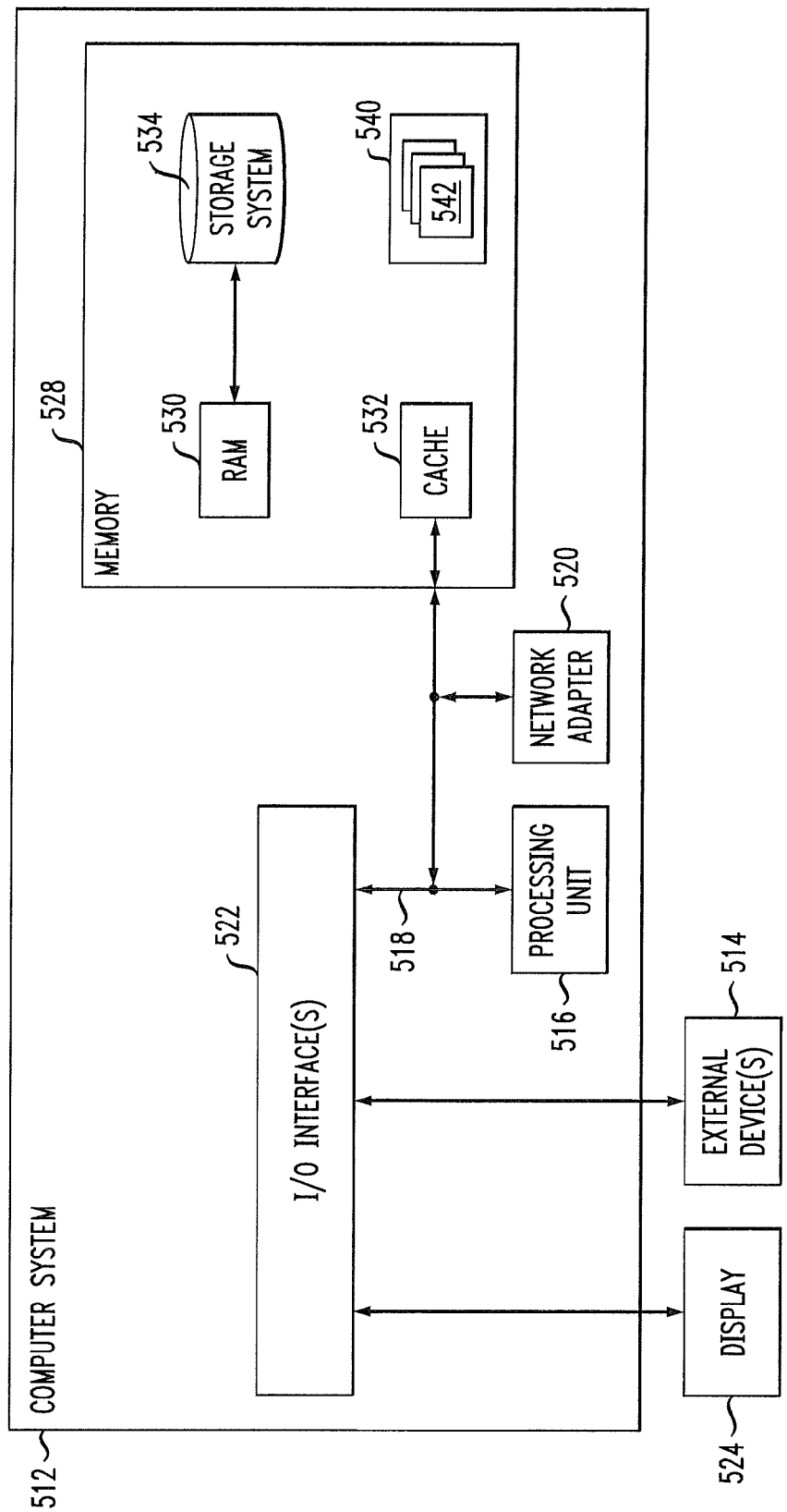
FIG. 5 illustrates a computer system in accordance with which one or more components/steps of the techniques of the invention may be implemented, according to an embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A system for customizing an electronic document including a memory and a processor communicatively coupled to the processor, comprising:
    a tracking module capable of automatically monitoring an interaction of a user with the document on an electronic device for reading the document, wherein the tracking module determines an area of interest of the document based on the user interaction; and
    a display module capable of altering cumulatively at least one of the appearance and behavior of the document on the electronic device at the area of interest, wherein the cumulative alteration is a function of a variable measure of the user interaction over a range, and accumulates stepwise as the variable measure of the user interaction grows;
    wherein altering the appearance of the document at the area of interest comprises marking a page of the document with at least one use indicator simulating a physical change to the appearance of the document, the at least on use indicator accumulating based on increasing use of the page;
    wherein altering the behavior of the document at the area of interest comprises inserting a plurality of detents respectively at a plurality of pages, wherein the detents appear during page flipping of the electronic document and comprise a tactile feedback respectively corresponding to and implemented at each page of the plurality of pages when flipping through the plurality of pages;
    wherein an intensity of a detent of the plurality of detents varies as a function of at least one of an amount of time the user spends on a page corresponding to the detent, a number of times the page corresponding to the detent was viewed by the user, a number of annotations the user placed on the page corresponding to the detent, and an amount of magnification the user has performed on the page corresponding to the detent;

wherein the user interaction is represented as a multidimensional vector;

wherein a behavior module mathematically maps information contained in the multidimensional vector to actual behavior of a page to be displayed on the electronic device;

wherein a parameterized physical model is used to mathematically map the information contained in the multidimensional vector to the actual behavior of the page to be displayed on the electronic device; and wherein the parameterized physical model comprises a set of virtual elastic couplings between virtual components of the document.

2. The system of claim 1, wherein the tracking module monitors at least one of the amount of time the user has spent on the page corresponding to the detent, the number of times the page corresponding to the detent was viewed by the user, the number of annotations the user placed on the page corresponding to the detent, and the amount of magnification the user has performed on the page corresponding to the detent.

3. The system of claim 1, wherein the electronic document comprises at least one of an electronic book, electronic magazine or electronic catalog, and the electronic device comprises at least one of an electronic reader, tablet or smart phone.

4. The system of claim 1, wherein the display module comprises a marking engine to perform the marking of the page of the electronic document with the at least one use indicator.

5. The system of claim 1, wherein the at least one use indicator comprises at least one of an electronic representation of dirt, a smudge, a stain, a hair, a rip, a fold, dust, a discolored edge.

6. The system of claim 1, wherein the behavior module is capable of determining a time delay to be inserted at a page including the area of interest, wherein the time delay appears during the page flipping of the electronic document.

7. The system of claim 1, wherein the behavior module is capable of determining the plurality of detents to be respectively inserted at the plurality of pages including the area of interest.

8. The system of claim 1, wherein the behavior module is capable of determining an increase in a probability of arriving at a page including the area of interest after multiple page flips.

9. An article of manufacture comprising a non-transitory computer readable storage medium comprising program code tangibly embodied thereon, which when executed by a computer, performs method steps for customizing an electronic document, the method steps comprising:

automatically monitoring an interaction of a user with the document on an electronic device for reading the document to determine an area of interest of the document;

determining the area of interest based on the user interaction; and altering cumulatively at least one of the appearance and behavior of the document on the electronic device at the area of interest, wherein the cumulative alteration is a function of a variable measure of the user interaction over a range, and accumulates stepwise as the variable measure of the user interaction grows;

wherein altering the appearance of the document at the area of interest comprises marking a page of the document with at least one use indicator simulating a physical change to the appearance of the document, the at least on use indicator accumulating based on increasing use of the page;

wherein altering the behavior of the document at the area of interest comprises inserting a plurality of detents respectively at a plurality of pages, wherein the detents appear during page flipping of the electronic document and comprise a tactile feedback respectively corresponding to and implemented at each page of the plurality of pages when flipping through the plurality of pages;

wherein an intensity of a detent of the plurality of detents varies as a function of at least one of an amount of time the user spends on a page corresponding to the detent, a number of times the page corresponding to the detent was viewed by the user, a number of annotations the user placed on the page corresponding to the detent, and an amount of magnification the user has performed on the page corresponding to the detent;

wherein the user interaction is represented as a multidimensional vector;

wherein the method steps further comprise mathematically mapping information contained in the multidimensional vector to actual behavior of the page to be displayed on the electronic device;

wherein a parameterized physical model is used to mathematically map the information contained in the multidimensional vector to the actual behavior of the page to be displayed on the electronic device; and wherein the parameterized physical model comprises a set of virtual elastic couplings between virtual components of the document.

10. An apparatus for customizing an electronic document, comprising:

a memory; and a processor coupled to the memory and configured to execute code stored in the memory for:

automatically monitoring an interaction of a user with the document on an electronic device for reading the document to determine an area of interest of the document;

determining the area of interest based on the user interaction; and altering cumulatively at least one of the appearance and behavior of the document on the device at the area of interest, wherein the cumulative alteration is a function of a variable measure of the user interaction over a range, and accumulates stepwise as the variable measure of the user interaction grows;

wherein altering the appearance of the document at the area of interest comprises marking a page of the document with at least one use indicator simulating a physical change to the appearance of the document, the at least on use indicator accumulating based on increasing use of the page;

wherein altering the behavior of the document at the area of interest comprises inserting a plurality of detents respectively at a plurality of pages, wherein the detents appear during page flipping of the electronic document and comprise a tactile feedback respectively corresponding to and implemented at each page of the plurality of pages when flipping through the plurality of pages;

wherein an intensity of a detent of the plurality of detents varies as a function of at least one of an amount of time the user spends on a page corresponding to the detent, a number of times the page corresponding to the detent was viewed by the user, a number of annotations the user placed on the page corresponding to the detent, and an amount of magnification the user has performed on the page corresponding to the detent;

wherein the user interaction is represented as a multidimensional vector;

wherein the processor is further configured to execute code for mathematically mapping information contained in the multidimensional vector to actual behavior of a page to be displayed on the electronic device;

wherein a parameterized physical model is used to mathematically map the information contained in the multidimensional vector to the actual behavior of the page to be displayed on the electronic device; and wherein the parameterized physical model comprises a set of virtual elastic couplings between virtual components of the document.

11. The system of claim 1, wherein elastic coefficients of the couplings are adjusted based on the user interaction with the document.

12. The system of claim 11, wherein the elastic coefficients decay back to their initial values over a predetermined time period.

13. The system of claim 1, wherein the couplings comprise virtual springs.

14. The article of manufacture of claim 9, wherein elastic coefficients of the couplings are adjusted based on the user interaction with the document.

15. The article of manufacture of claim 14, wherein the elastic coefficients decay back to their initial values over a predetermined time period.

16. The article of manufacture of claim 9, wherein the couplings comprise virtual springs.

17. The apparatus of claim 10, wherein the processor is further configured to execute code for monitoring at least one of the amount of time the user has spent on the page corresponding to the detent, the number of times the page corresponding to the detent was viewed by the user, the number of annotations the user placed on the page corresponding to the detent, and the amount of magnification the user has performed on the page corresponding to the detent.

18. The apparatus of claim 10, wherein elastic coefficients of the couplings are adjusted based on the user interaction with the document.

19. The apparatus of claim 18, wherein the elastic coefficients decay back to their initial values over a predetermined time period.

20. The apparatus of claim 10, wherein the couplings comprise virtual springs.

* * * * *